United States Patent [19]

Giulie et al.

[11] 3,975,975

[45] Aug. 24, 1976

[54] PAPER SAWING MACHINE

[75] Inventors: Joe D. Giulie; Leslie E. Worcester, both of Los Altos, Calif.

[73] Assignee: Minnesota Mining and Manufacturing Company, St. Paul, Minn.

[22] Filed: Oct. 2, 1975

[21] Appl. No.: 618,899

[52] U.S. Cl. .................................... 83/410; 83/751; 83/618

[51] Int. Cl.² ........................ B26D 7/06; B23D 49/00

[58] Field of Search ............. 83/409, 437, 751, 781, 83/618, 410; 144/85, 87

[56] References Cited

UNITED STATES PATENTS

| | | | |
|---|---|---|---|
| 137,830 | 4/1873 | Cullen | 144/85 |
| 3,908,723 | 9/1975 | Hill | 83/410 X |

*Primary Examiner*—Willie G. Abercrombie
*Attorney, Agent, or Firm*—Alexander, Sell, Steldt & DeLaHunt

[57] ABSTRACT

A machine for sawing a plurality of spaced L-shaped slots through a stack of paper sheets starting from one edge surface of the stack, which slots are adapted to receive a device for binding the stack of sheets together. The machine includes a plurality of elongated saw blades having cutting teeth all around their peripheries and mounted side by side in spaced parallel relationship. The machine reciprocates the saw blades along their longitudinal axes to afford cutting engagement with the blades by the stack of sheets from any direction normal to the axes of the blades; while moving a planar support surface disposed normal to the axes of the saw blades and to which the stack of sheets is clamped in an L-shaped pattern to engage the stack of sheets with the saw blades and cut the L-shaped slots.

6 Claims, 6 Drawing Figures

PAPER SAWING MACHINE

BACKGROUND OF THE INVENTION

1. Field of the Invention

This invention relates to machines for forming a plurality of spaced openings through a stack of sheets adjacent one edge of the stack in preparation for binding the sheets through the openings; and in one aspect to such a machine which forms a plurality of spaced nonlinear slots through such a stack of sheets with the slots starting from the edge surface of the stack.

2. Description of the Prior Art

One common method for binding a stack of paper sheets is to use a machine to form a plurality of openings through a stack of sheets adjacent one edge of the stack, and to subsequently position a device through the openings to bind the sheets together.

Preferably a machine for forming such openings should form the openings simultaneously, should accommodate a relatively thick stack of sheets and should form openings of a shape which afford secure engagement with a binding device to be inserted through the openings. Also, preferably the device should be able to form the openings despite previous bindings on the edges of the sheets, which bindings may include glue, staples, stitching or hard covers.

Conventional punching machines can be used for forming circular openings which provide good engagement of the binding device with the stack. Normally, however, such machines are limited to forming openings in relatively thin stacks of sheets unless multiple punching operations are performed.

U.S. Pat. No. 3,357,280 describes a machine for forming a series of circular openings in relatively thick stacks of sheets via the use of a plurality of hollow drill bits. However, the presence of materials such as glue from previous bindings might tend to plug the hollow drill bits.

U.S. Pats. Nos. 427,931 and 1,105,056 both describe a machine for forming openings adjacent an edge of a stack of sheets by sawing slots into the stack starting from the edge surface with rotary or reciprocating saw blades. While such machines could presumably saw such slots to form openings in relatively thick stacks of sheets, they can only form linear slots which may not afford the degree of engagement with a binding device that is desired.

U.S. Pat. No. 1,980,267 describes a machine which can form a plurality of spaced nonlinear T-shaped openings along and starting from an edge of a stack of sheets. The machine described in U.S. Pat. No. 1,980,267, however, requires a sequence of sawing and piercing operations to form the openings. The piercing operation might limit the thickness of a stack of sheets in which the openings can be formed. Also the piercing operations do not form openings of sufficient width to receive many types of binding elements.

SUMMARY OF THE INVENTION

A machine according to the present invention can simultaneously form a plurality of spaced slots through a relatively thick stack of paper sheets starting from one edge of the stack, which slots have a predetermined nonlinear shape and a width adapted to provide a secure engagement with a binding device. (Nonlinear slots as referred to herein are slots through the stack of paper that substantially change their directions with respect to the major surface of the stack, such as L, T or J-shaped slots, so that there is at least one inner portion of the slot which runs generally parallel to the adjacent edge surface of the stack and which is separated therefrom by a portion of the stack.)

The machine according to the present invention includes a plurality of saw blades each comprising an elongated rod along which is disposed a multiplicity of cutting teeth. The machine supports the saw blades in a side by side spaced parallel relationship with the longitudinal axes of the rods in a common plane and moves the saw blades to afford cutting engagement by a stack of paper with the cutting teeth from any direction normal to the axes of the rods. The machine also includes support means adapted for releasably securing a stack of sheets on a planar support surface in a first position with one edge of the stack of sheets in a predetermined position aligned along and closely adjacent the saw blades, with the support surface being essentially normal to the longitudinal axes of the saw blades; and means for moving the support means and saw blades relative to each other in a predetermined nonlinear pattern with the planar surface normal to the axes of the saw blades so that the saw blades engage the edge portion of the stack of paper sheets and form a plurality of nonlinear slots in the stack corresponding to the predetermined pattern.

Potentially saw blades having cutting teeth along at least one side could be rotated about their axes to afford cutting engagement with the stack from any direction normal to their longitudinal axes. Preferably, however, the saw blades have cutting teeth all around their periphery, and are axially reciprocated to provide such cutting engagement.

Also, preferably, the cutting teeth are made of tungsten carbide and can readily sever stacks of paper and their previous bindings, including glue, staples, stitching, and hard covers. Thus, for example, a plurality of periodicals can be bound together without removing staples, or trimming off glue and page edges as part of the prebinding preparation.

BRIEF DESCRIPTION OF THE DRAWING

The invention will be further described with reference to the accompanying drawings wherein like numbers refer to like parts in the several views, and wherein.

DESCRIPTION OF THE PREFERRED EMBODIMENT

Figure 1:
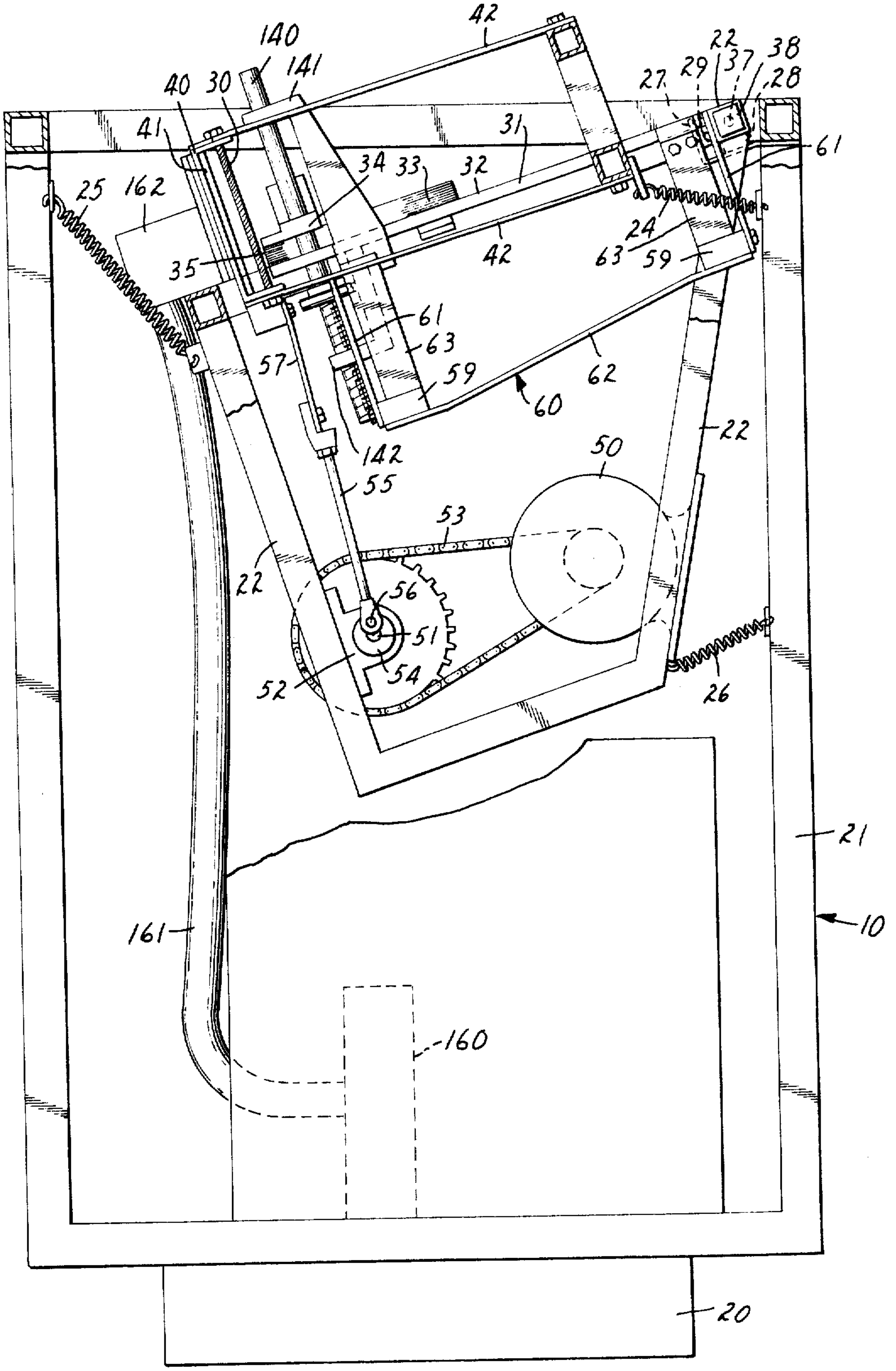
FIG. 1 is a vertical side view of a machine according to the present invention having parts broken away to show details.
Figure 2:
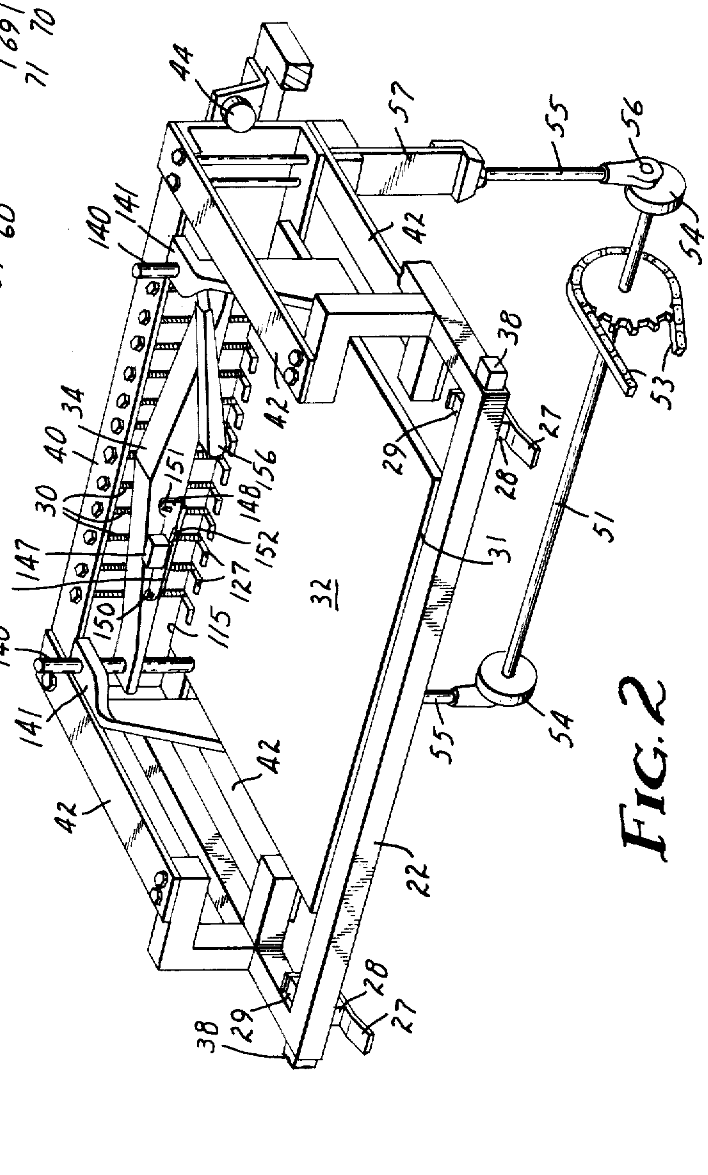
FIG. 2 is a fragmentary perspective view showing a saw blade support and drive mechanism of the machine of FIG. 1.
Figure 4:
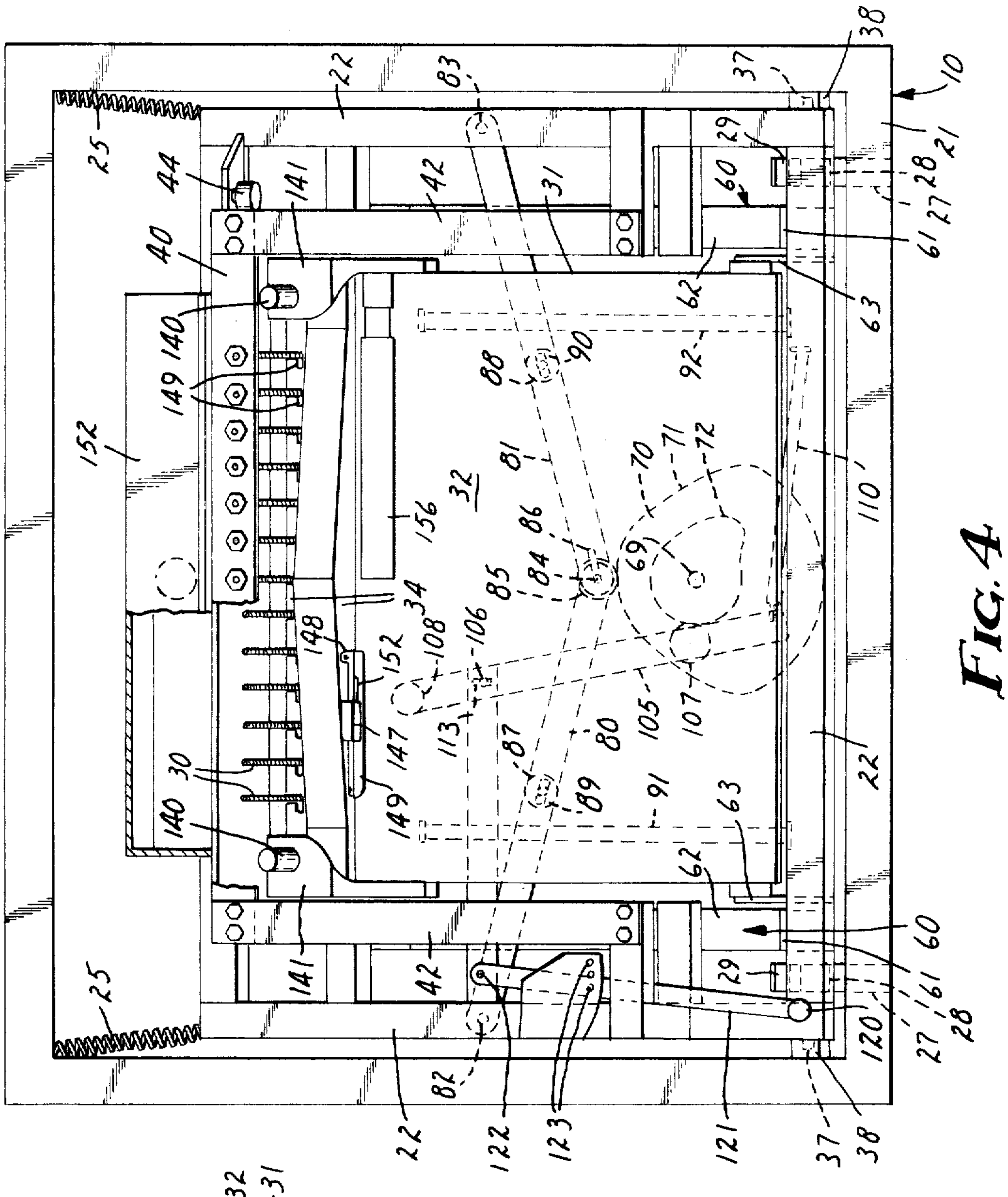
FIG. 4 is a top view of the machine of FIG. 1 having parts broken away to show details.

Referring now to the drawing there is illustrated a machine according to the present invention, generally designated by the numeral 10. As is best seen in FIG. 1, the machine 10 includes a base 20 that supports a main frame 21. A subframe 22 which supports the majority of the mechanisms for the machine 10 is supported by the main frame 21 by three pairs of springs 24, 25 and 26 and by two rubber padded steel hooks 27 that are rigidly mounted to the front of the mainframe 21. Each hook 27, as shown in FIGS. 1, 2 and 4, has rubber mountings 28 and 29 adapted to engage and support the subframe 22. The subframe 22 also has two cylindrical projections 37 with each projection having a rubber bumper 38 mounted on it such that the bumpers 38 lie between the subframe 22 and the mainframe 21 to prevent sideways motion. Such mounting of the subframe 22 reduces vibrational noises during operation of the machine 10.

Briefly, the machine 10 includes paper cutting means comprising a bank of parallel elongated saw blades 30 having cutting teeth on all sides of their central portions; means for reciprocating the bank of saw blades 30 along their longitudinal axes to afford cutting engagement with the saw blades from any direction normal to their longitudinal axes; and paper support means including a table 31 having a planar support surface 32 mounted normal to and adjacent to the bank of saw blades 30. A stack of paper sheets 33 to be slotted is releasably secured on the support surface 32 by means including a clamping bar 34 with an edge surface 35 of the paper closely adjacent or contacting the saw blades 30. Means are provided for moving the table 31 and the stack of paper 33 clamped thereto in a predetermined pattern and in a plane normal to the axes of the saw blades 30 to engage the adjacent edge portion of the stack of paper 33 with the reciprocating saw blades 30 and cut a plurality of nonlinear slots into the paper from the edge surface 35, which slots correspond in shape to the predetermined pattern.

Each saw blade 30 comprises a generally cylindrical rod with tungsten carbide cutting teeth adhered entirely around the central portion of its periphery, such as the tungsten carbide rod saws commercially available from Remington Arms Company, Inc.

The means for reciprocating the bank of saw blades 30 includes means for mounting the saw blades for reciprocal motion and means for reciprocally driving the saw blades.

As is best seen in FIG. 2, the means for mounting the saw blades for reciprocal motion includes a U-shaped channel 40 on which the saw blades 30 are mounted in a side by side spaced parallel relationship with the longitudinal axes of the saw blades 30 in a common plane, which common plane is called "the plane of the saw blades" herein. The saw blades 30 are mounted under tension between the legs of the channel 40 with the upper end of each saw blade 30 having a D-shaped threaded end portion that passes through a corresponding D-shaped hole in the channel 40 and mates with an appropriate locking nut. A reinforcement bar 41 is located behind each saw blade 30 and between the legs of the channel 40 to insure sufficient stiffness in the channel to tension the saw blades 30. The channel 40 is mounted to the subframe 22 by four thin flat elongated spring-like members or flexures 42, with each flexure being bolted at one of its ends to the subframe 22 and at its other end to the U-shaped channel 40. The flexures 42 are made of a relatively flexible resilient support material capable of being repeatedly flexed in the direction of their narrowest dimension, e.g. such as 3M Brand ScotchPly available from 3M Company. As the channel 40 is reciprocated the flexures bend similar amounts and cause the motion of the saw blades 30 to be generally along their longitudinal axes with a very negligible amount of motion in a direction normal thereto. Because the central portions of the saw blades 30 have cutting teeth on all sides of their peripheral surfaces, reciprocation of the saw blades 30 along their longitudinal axes affords cutting engagement with the cutting teeth from any direction essentially normal to their longitudinal axes. A roller bearing 44, mounted on the subframe 22, guides the end of the channel 40 and provides additional support for the channel 40 when the blades 30 are sawing along their sides opposite to the bearing 44.

The means for reciprocally driving the bank of saw blades 30 is best seen in FIGS. 1 and 2. An electric motor 50, mounted on the subframe 22, drives a shaft 51 rotatably mounted in bearings 52 on the subframe 22 via a chain and sprocket drive 53. At each end of the shaft 51 there is fixed a wheel 54 that is eccentrically connected to one end of a rod 55 at a pivot point 56. Each rod 55 is attached at its other end to one end of a flexure 57 with the other end of each of the flexures 57 being attached to a different end of the channel 40. When the shaft 51 is rotated by the motor 50, the rods 55 and the channel 40 containing the saw blades 30 are reciprocated by the eccentric motion of the pivot points 56 with the flexures 57 allowing for relative motion therebetween.

The means for moving the table 31 and the stack of paper 33 clamped thereto to engage the edge portion of the stack of paper 33 with the adjacent reciprocating saw blades 30 comprise means mounting the table 31 for limited movement while maintaining the support surface 32 essentially normal to the axes of the saw blades, and means for moving the table in a predetermined pattern relative to the longitudinal axes of the saw blades 30.

Figure 3:
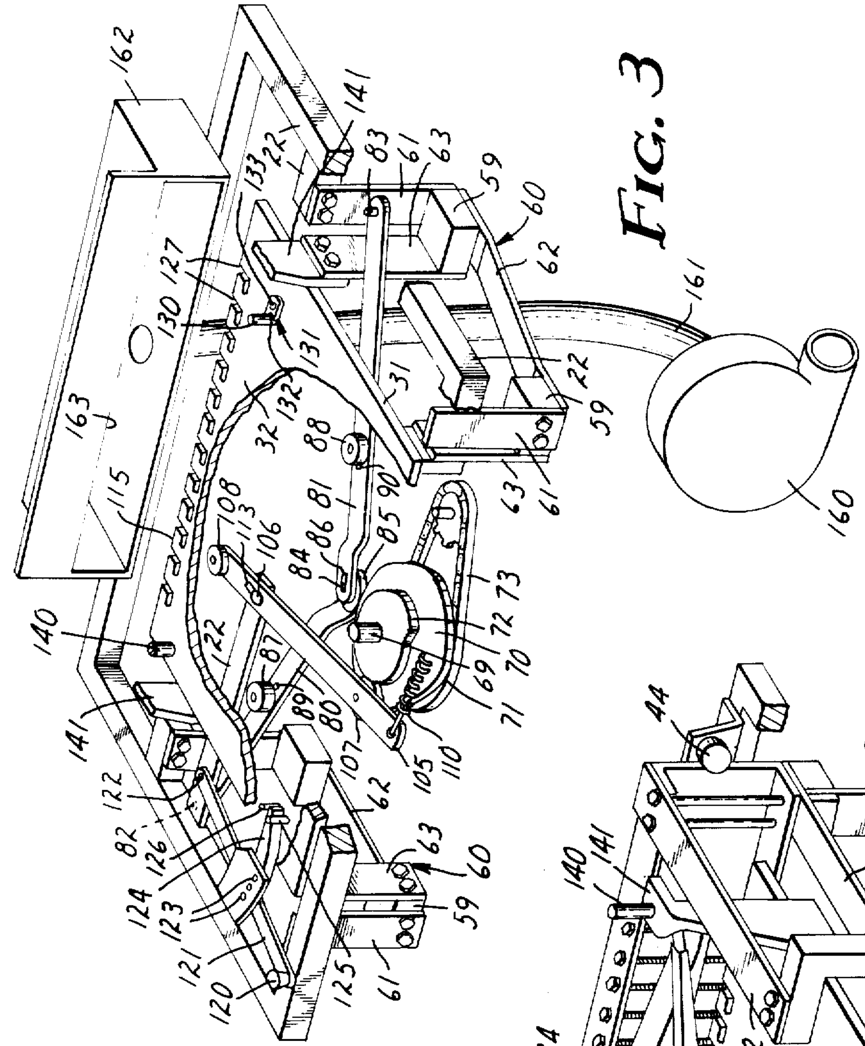
FIG. 3 is a fragmentary perspective view showing a support table and a support table drive mechanism of the machine of FIG. 1.

The means mounting the table 31 for limited movement while maintaining the support surface 32 essentially normal to the axes of the saw blades comprise a pair of support assemblies 60 positioned on opposite sides of the table 31 as is best seen in FIG. 3. Each support assembly 60 includes a first pair of spaced parallel flexures 61 attached at their ends between the subframe 22 and a block 59 at each end of an elongated steel plate 62; and a second pair of coplanar flexures 63 each having one of its ends attached to the table 31 and its other end attached to a surface of a different one of the blocks 59 on a surface of the block 59 disposed at 90 degrees to the surface to which the end of the flexure 61 is attached and aligned along an edge surface of the steel plate 62. The broad side surfaces of the first pair of flexures 61 are in a generally orthogonal relationship to the broad side surfaces of the second pair of flexures 63 so that the first pair of flexures 61 will bend to permit movement of the steel plates 62 and the table 31 either toward or away from the plane of the saw blades 30 while the second pair of flexures 63 will bend to permit movement of the table 31 in a direction parallel to the plane of the saw blades 30. The first group of four flexures 61 and/or the second group four flexures 63 bend in similar manner as a group so that the planar surface 32 remains essentially normal to the longitudinal axes of the saw blades 30 irrespective of table movement.

The means for moving the table 31 in a predetermined pattern relative to the axes of the saw blades 30 moves the table 31 from a first position with the saw blades aligned along and closely adjacent or contacting the edge surface 35 of the stack of paper 33 clamped to the table 31, along a predetermined path with the saw blades 30 engaging an edge portion of the paper. The table 31 is first moved in a direction normal to the edge surface 35 of the stack of paper 33 and then in a direction generally parallel to the edge surface 35 of the stack of paper 33 to a second position to form a plurality of nonlinear generally L-shaped slots 65 in the paper (see FIG. 6).

Referring now to FIGS. 3 and 4, the means for moving the table 31 includes a cam 70 fixed to a shaft 69 rotatably mounted on the subframe 22 and having first and second cam surfaces 71 and 72. The cam 70 can be rotated with the shaft 69 by an electric table drive motor (not shown) via a chain and sprocket drive 73. Current to the table drive motor is limited to provide a preset maximum amount of torque to the cam 70, thereby limiting the amount of force that can be applied between the blades 30 and the stack of paper 30, and thus the bending of the blades 30 during the sawing operation.

The first cam surface 71 interacts with a pair of levers 80 and 81 to cause movement of the table 31 normal to the plane of the saw blades 30. The levers 80 and 81 are respectively pivotally mounted on the subframe 22 by pins 82 and 83. A shaft 84 is fixed to the end of the lever 80 opposite the pin 82, passes through a slot 86 in the corresponding end of the lever 81, and rotatably supports a first cam follower 85 for contacting the first cam surface 71. The slot 86 affords movement of the shaft 84 longitudinally of the arm 81 to afford changes in the relative positions of the adjacent ends of the levers 80 and 81. A pair of projections 87 and 88 on the underside of the table 31 have projecting shafts that respectively ride in slots 89 and 90 in the levers 80 and 81, which slots 89 and 90 allow table movement parallel to the plane of the saw blade axes. Rotation of the cam 70 to move a portion of the first cam surface 71 of increasing radius under the follower 85 will move the major portion of the table 31 in a first direction normally toward the plane of the saw blades 30 via the levers 80 and 81 which act on the projections 87 and 88, whereas a pair of springs 91 and 92 tensioned between the table 31 and the subframe 22 bias the first cam follower 85 against the first cam surface 71 and provide movement of the major portion of the table 31 normally away from the plane of the saw blades 30 when portions of the first cam surface 71 of decreasing radius are moved under the follower 85.

The second cam surface 72 acts on a second cam follower 107 rotatably mounted on an arm 105 to cause motion of the table 31 in a second direction parallel to the plane of the saw blades 30, generally transverse to the first direction of table movement, and generally in the same plane as the movement in the first direction. One end of the arm 105 is pivotally mounted on a pin at a projection 108 on the underside of the table 31. The arm 105 has a slot 113 which slidably receives a pin 106 fixed on a projecting portion of the frame 22. The slot 113 is aligned generally normal to the plane of the saw blades 30 to permit the arm 105 to move with the table 31 normal to the plane of the saw blades 30 via action of the first cam surface 71, while causing pivoting of the arm 105 on the pin 106 when forces are applied to the arm in a direction parallel to the plane of the saw blades 30. A spring 110 tensioned between an end of the arm 105 and subframe 22 biases the second cam follower 107 against the second cam surface 72. Rotation of the cam 70 to move a portion of the second cam surface 72 of increasing radius under the follower 107 will move the table 31 in one direction parallel to the plane of the saw blades 30 via pivoting of the lever arm 105 about the pin 106; whereas the spring 110 produces movement of the table in the other direction parallel to the plane of the saw blades 30 when portions of the cam surface 72 of decreasing radius move under the follower 107.

The first and second cam surfaces 71 and 72 are shaped to move the table in an L-shaped pattern during rotation of the cam 70. First, a portion of the first cam surface 71 of increasing radius moves the table 31 until the levers 80 and 81 form a straight line while a circular portion of the second cam surface 72 moves along the follower 107 so that an edge portion of the stack of paper clamped on the surface will engage the saw blades 30 to cut first portions of the L-shaped slots 65 normal to the edge surface 35 of the stack of paper 33. Next, a circular portion of the first cam surface 71 maintains the table 31 in the same position normal to the plane of the saw blades 30, while a portion of the second cam surface 72 of increasing radius moves the table 31 a predetermined distance parallel to the plane of the saw blades 30 to form second portions of the L-shaped slots 65 parallel to the edge surface 35 of the stack of paper 33. The cam surfaces 71 and 72 then allow movement of the table to retrace the L-shaped cut under the influence of the springs 91, 92, and 110 to disengage the paper from the saw blades 30.

The machine also includes means for aligning the stack of paper 33 in a predetermined position relative to the table 31 prior to clamping it to the table 31, including means for aligning the stack to provide varying depths of cut of the blades 30 normally into the stack of paper 33 during the cutting cycle so that the length of the first portions of the L-shaped slots 65 can be varied.

The means for aligning the stack of paper 33 includes the surfaces of the saw blades along an edge 115 of the table 31, and a paper guide assembly 131 adjustably mounted on the table 31. The paper guide assembly includes a cylindrical rod 130 mounted to a base 132 with the longitudinal axis of the rod 130 disposed parallel to the axes of the blades 30 and with one end of the rod 130 disposed against the support surface 32 of the table 31. The base 132 is attached to the table 31 by a set screw 133 at a position spaced from the axis of the rod 130 to afford releasing the set screw 133 and pivoting the base 132 thereabout to a desired position for the rod 130.

The means for aligning the stack to provide varying depths of cuts of the blades normally into the paper is best seen in FIG. 3. An arm 121 has one end pivotally mounted to the subframe 22 by a pin 122 and has a knob 120 at its other end. The knob 120 affords manual movement of the arm 121 to any one of three discrete positions defined by detents 123 between the arm 121 and the frame 22. A wedge-shaped member 124 is attached to the arm 121 and has a tapered end portion positioned between a post 125 fixed to the subframe 22 and a post 126 fixed to the table 31. Movement of the arm 121 from its first position closest the side of the machine 10 separates the posts 125 and 126. This causes the major portion of the table 31 to move toward the saw blades 30 which are then positioned in the slots 127 in the table 31, and causes the cam follower 85 to move away from the first cam surface 71 a predetermined amount. Since the edge surface 35 of the stack of paper 33 is initially positioned against the saw blades 30, such initial positioning of the major portion of the table 31 closer to the blades 30 changes the amount of movement of the table toward the blades 30 that will be caused by engagement of the first cam surface 71 with the follower 85 during the cycle of the cam 70 so that the depth of the cut in the paper by the saw blades 30 is decreased.

Figure 5:
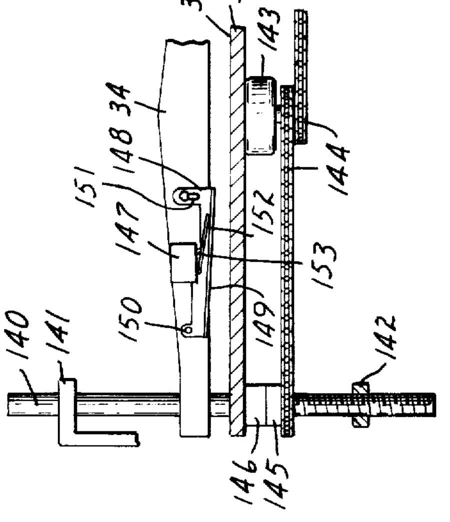
FIG. 5 is a fragmentary sectional view showing a paper clamp and a paper clamp drive mechanism of the machine of FIG. 1.

The means adapted for releasably securing the stack of paper on the planar surface 32 includes a clamp formed by a portion of the planar surface 32 and the clamp bar 34. As is shown in FIGS. 2, 4 and 5, each end of the clamp bar 34 is fixedly attached to a rod 140 that is slidably guided in a pair of brackets 141 and 142 fastened to the table 31. One end of each rod 140 is threaded and is threadably engaged by a nut 145 rotatably mounted on a collar 146 fixed to the table 31. A reversible electric motor 143, mounted on the side of the table 31 opposite the surface 32, can be activated to drive the nuts 145 via a pair of chain and sprocket drives 144 and thereby move the clamping bar 34 between clamped and unclamped positions. The clamp position is established by a control which deactivates the motor 143 when the current drawn by the motor reaches a predesignated value as the motor tends to stall under the load of driving the clamp bar 34 against the stack of paper 33. The unclamped position is established by a microswitch 147 mounted on the clamp bar 34. A bracket 148 having a lower lip 149 is pivotally mounted on the clamp bar 34 at a pin 150 and has a slot 151 in its end opposite the pin 150 in which a projection of the clamp bar 34 rides. One end of a leaf spring 152 rides along the lip 149 with the other end of the leaf spring 152 attached to the microswitch 147 remote from a switch activating button 153. The microswitch 147 moves away from the stack of sheets 33 and the lip 149 as the bar 34 is unclamped via the motor 143 until the leaf spring 152 riding on the lip 149 moves sufficiently to deactivate the microswitch 143 via the button 153 and thereby deactivate the motor 143.

The table 31 and the paper clamp bar 34 have slots 127 and 149 respectively (slots 127 shown in the table 31 in FIGS. 2 and 3 and slots 149 in the clamp bar 34 in FIG. 4) along their edges adjacent the saw blades 30 to permit them to support the edge portion of the paper during the sawing operation while keeping the table 31 and the bar 34 out of contact with the saw blades 30.

A vacuum collector 160, connected via a flexible suction hose 161 to inlet housing 162, collects paper chaff that is generated during the sawing operation. The housing 162, mounted on the subframe 22, has an inlet opening 163 adjacent the side of the channel 40 opposite the saw blades 30, and the channel 40 has openings through which may pass paper chaff formed by the saw blades 30.

Figure 6:
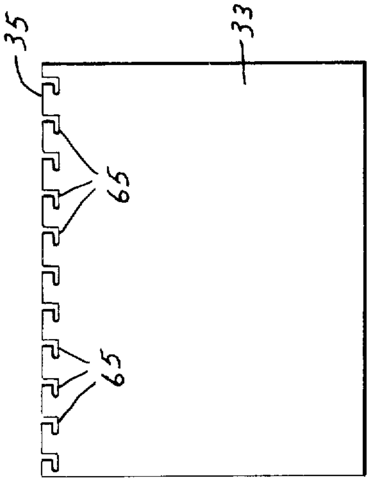
FIG. 6 is a top view of a stack of paper having nonlinear slots as are formed by the machine of FIG. 1.

FIG. 6 shows a top view of the stack of paper 33 having a plurality of the spaced nonlinear L-shaped slots 65 formed by the machine 10. Preferably the slots 65 are spaced on 1 inch (25.4 mm) centers, are aproximately 0.10 inch (2.54 mm) wide with both portions of each L-shaped slot 65 being approximately 0.22 inch (5.59 mm) long. While the machine 10 illustrated saws L-shaped slots, a machine according to the present invention could be programmed (by changing the cam 70 and the slots 127 and 149) to saw nonlinear slots of various predetermined sizes and shapes such as for example, T-shaped or J-shaped slots.

To operate the sawing machine 10, the operator positions a stack of paper 33 on the table surface 32 with one edge surface of the paper in contact with the saw blades 30 and another edge surface of the paper adjacent the cylindrical rod 130. The operator then activates an automatic control circuit sequence for the machine 10 such as by closing a cover on the machine (not shown). The presence of the stack of paper 33 under the clamp bar 34 moves an end of a paper sensor arm 156 away from the surface 32 and closes a contact, so that the control circuitry will activate the electric motor 143 to move the clamp bar 34 against the stack of paper; will activate the vacuum collector 160 which collects paper chaff resulting from the sawing operation, and will activate the electric motor 50 which reciprocates the saw blades 30 in the channel 40 via the shaft 51, the eccentrics 56, and the flexures 57.

While the saw blades 30 are reciprocating, the first cam surface 71 moves the table 31 via the levers 80 and 81 and the table projections 87 and 88 to engage the stack of paper with the saw blades 30 and saw the first portions of the L-shaped slots 65 which are normal to the edge surface 35 of the stack of paper 33. The cam surface 72 then moves the table 31 via the lever arm 105 and the table projection 108 to saw the second portions of the L-shaped slots 65 that are parallel to the edge surface 35 of the stack of sheets 33. The cam surfaces 72 and 71 then move the table 31 to retrace the L-shaped path and disengage the stack of paper 33 on the table 31 from the saw blades 30.

Upon completion of the table movement, the control circuitry stops the reciprocation of the saw blades 30 and the vacuum collector 160 and then again activates the motor 143 to move the clamp bar 34 away from the stack of paper about one-quarter inch. This position is determined by disengagement of the leaf spring 152 from the switch button 153 as the bracket 148 pivots away from the switch 147.

The slotted stack of sheets can then be removed from the machine 10, and the machine 10 is ready to receive a new stack of sheets 33 to be slotted. If the next stack of sheets to be slotted is substantially thicker than the last, the operator can activate the motor 143 to move the clamp bar 34 further away from the table surface 32 by activating the microswitch 147.

We claim:

1. A machine adapted for forming a plurality of spaced nonlinear slots of a predetermined pattern through an edge portion of a stack of paper starting from an edge surface of the stack, said machine comprising:

cutting means including a plurality of saw blades, each blade comprising an elongated portion having a longitudinal axis and a multiplicity of cutting teeth disposed along said elongated portion;

means for mounting said blades in a generally side by side spaced parallel relationship with the axes of said elongated portions in a common plane; and means for moving said saw blades to afford cutting engagement with said cutting teeth from any direction essentially normal to the axes of said saw blades;

support means adapted for holding a said stack of paper comprising a planar support surface and means adapted for releasably securing the stack of paper on said planar support surface with the edge surface of the stack of paper in a predetermined position relative to said support surface; and means for mounting said support means and said cutting means for movement relative to each other with said support surface being essentially normal to the axes of said saw blades, said relative movement adapted to be from a first position with the blades of said cutting means aligned along and closely adjacent the edge surface of a said stack of paper on said support means along a predetermined path corresponding to a said predetermined pattern with said blades engaged through the edge portion of the stack of paper to a second position to form a plurality of nonlinear slots in the stack of paper corresponding to the predetermined pattern.

2. A machine according to claim 1 wherein said saw blades have teeth around the entire periphery of their elongated portions, and said means for moving said saw blades to afford cutting engagement with said cutting teeth in any direction normal to the axes of said saw blades comprises means for reciprocating said saw blades in a direction essentially along their axes.

3. A machine according to claim 1 wherein said teeth comprise tungsten carbide grit adhered around said elongated portions.

4. A machine according to claim 1 wherein said means for mounting said support means and said cutting means for movement relative to each other with said support surface being essentially normal to the axes of the saw blades comprises means for moving said support means while maintaining the axes of the saw blades generally along lines fixed relative to said support means.

5. A machine adapted for forming a plurality of spaced nonlinear slots of a predetermined pattern through an edge portion of a stack of paper starting from an edge surface of the stack, said machine comprising:

a frame;

cutting means mounted on said frame including a plurality of saw blades, each blade comprising an elongated portion having an axis and tungsten carbide grit adhered around the periphery of said elongated portion;

means for mounting said blades in a generally side by side spaced parallel relationship with the axes of said elongated portions in a common plane;

means for axially reciprocating said saw blades relative to said frame to afford cutting engagement with said grit from any direction essentially normal to the axes of said saw blades;

support means adapted for holding a said stack of paper comprising a planar support surface and means adapted for releasably securing the stack of paper on said planar support surface with the edge surface of the stack of paper at a predetermined position relative to said planar support surface;

means mounting said support means on said frame for movement relative to said frame with said planar support surface essentially normal to the axes of said saw blades; and means for moving said support means relative to said frame from a first position with the edge surface of a said stack of paper secured on said support surface aligned along and closely adjacent said blades along a predetermined path corresponding to a said predetermined pattern with said blades engaged through the edge portion of the stack of paper to a second position to form a plurality of nonlinear slots in the stack of paper corresponding to the predetermined pattern.

6. A machine according to claim 5 wherein said means for moving said support means along a predetermined path with the saw blades engaged through the stack of paper to form a plurality of nonlinear slots comprises:

a cam rotatably mounted on said frame, said cam having first and second cam surfaces; and first and second cam followers coupled to said support means and respectively engaged with said first and second cam surfaces, said first cam surface and follower being adapted to move said support means in directions generally normal to the common plane of said saw blade axes and said second cam surface and follower being adapted to move said support means in directions generally parallel to the common plane of said saw blade axes.

* * * * *